(12) United States Patent
Hong

(10) Patent No.: US 9,830,933 B2
(45) Date of Patent: Nov. 28, 2017

(54) MEDIA CONTENT PLAYING SCHEME

(71) Applicant: KT Corporation, Seongnam-si, Gyeonggi-do (KR)

(72) Inventor: Junhyuk Hong, Seoul (KR)

(73) Assignee: KT CORPORATION, Seongnam-si (KR)

( * ) Notice: Subject to any disclaimer, the term of this patent is extended or adjusted under 35 U.S.C. 154(b) by 231 days.

(21) Appl. No.: 14/558,950

(22) Filed: Dec. 3, 2014

(65) Prior Publication Data

US 2015/0154982 A1    Jun. 4, 2015

(30) Foreign Application Priority Data

Dec. 3, 2013    (KR) .................... 10-2013-0149297

(51) Int. Cl.

| | |
|---|---|
| *G10L 21/00* | (2013.01) |
| *G10L 15/00* | (2013.01) |
| *G10L 25/78* | (2013.01) |
| *H04N 5/783* | (2006.01) |
| *G10L 25/87* | (2013.01) |
| *G10L 25/48* | (2013.01) |
| *G11B 27/00* | (2006.01) |
| *G11B 27/28* | (2006.01) |
| *G10L 17/00* | (2013.01) |

(52) U.S. Cl.

CPC .............. *G10L 25/78* (2013.01); *G10L 25/48* (2013.01); *G10L 25/87* (2013.01); *G11B 27/005* (2013.01); *G11B 27/28* (2013.01); *H04N 5/783* (2013.01); *G10L 17/00* (2013.01)

(58) Field of Classification Search
None
See application file for complete search history.

(56) References Cited

U.S. PATENT DOCUMENTS

| | | | | |
|---|---|---|---|---|
| 8,290,141 | B2 * | 10/2012 | Dyba ................ | G10L 19/012 |
| | | | | 379/406.03 |
| 8,972,262 | B1 * | 3/2015 | Buryak ............... | G10L 15/28 |
| | | | | 704/251 |
| 9,135,952 | B2 * | 9/2015 | Duwenhorst ........ | G11B 27/00 |
| 9,313,633 | B2 * | 4/2016 | Ozzie ................... | H04W 4/206 |
| 9,368,116 | B2 * | 6/2016 | Ziv ........................ | G10L 25/78 |
| 9,672,825 | B2 * | 6/2017 | Arslan .................. | G10L 25/63 |

(Continued)

FOREIGN PATENT DOCUMENTS

| | | |
|---|---|---|
| JP | 2007-329605 A | 12/2007 |
| KR | 10-2003-0024257 A | 3/2003 |

(Continued)

*Primary Examiner* — Satwant Singh
(74) *Attorney, Agent, or Firm* — Brundidge & Stanger, P.C.

(57) ABSTRACT

A system may include a server configured to detect speech data from media content and to divide the detected speech data into one or more speech data segments in accordance with at least a respective speaker and a break in the detected speech data; and a media content playing device configured to receive the speech data segments from the server, to receive, from an input device, a control signal to play the media content, and to skip forward or rewind to play the media content starting at the identified starting point corresponding to a first one of the respective speech data segments.

12 Claims, 7 Drawing Sheets

(56) References Cited

U.S. PATENT DOCUMENTS

| | | | |
|---|---|---|---|
| 2002/0062210 A1* | 5/2002 | Hamada | G11B 27/107 704/235 |
| 2011/0014403 A1 | 1/2011 | Wang et al. | |
| 2013/0231761 A1* | 9/2013 | Eronen | G10L 25/54 700/94 |
| 2014/0289241 A1* | 9/2014 | Anderson | G06F 17/30038 707/736 |
| 2014/0363138 A1* | 12/2014 | Coviello | G11B 27/28 386/241 |

FOREIGN PATENT DOCUMENTS

| | | |
|---|---|---|
| KR | 10-2007-0018202 A | 2/2007 |
| KR | 10-2011-0033646 A | 3/2011 |

* cited by examiner

SPEECH DATA
SEGMENTS TABLE

MEDIA CONTENT PLAYING SCHEME

TECHNICAL FIELD

The embodiments described herein pertain generally to a media content playing scheme.

BACKGROUND

When watching media content, a user may use a FF (Fast Forward)/REW (Rewind) function, via a user interface, to find specific parts of the media content. But, if the FF/REW functionality skips segments of the media content, as defined by particular time units, the user may experience difficulty in following a storyline in the media content.

SUMMARY

In one example embodiment, a system may include: a server configured to detect speech data from media content and to divide the detected speech data into one or more speech data segments in accordance with at least a respective speaker and a break in the detected speech data; and a media content playing device configured to receive the speech data segments from the server, to receive, from an input device, a control signal to play the media content, and to skip forward or rewind to play the media content starting at the identified starting point corresponding to a first one of the respective speech data segments.

In another example embodiment, a server may include: a speech data detector configured to detect speech data from media content; a speech data divider configured to divide the detected speech data into one or more speech data segments in accordance with at least a respective speaker and a break in the detected speech data; a request receiver configured to receive a request to transmit the speech data segments to a media content playing device; and a transmitter configured to transmit the speech data segments to the media content playing device.

In yet another example embodiment, a media content playing device may include: a speech data receiver configured to receive speech data segments from a server; an input receiver configured to receive, from an input device, a control signal to play a media content; an identifier configured to identify one or more starting points for the respective speech data segments in the media content, upon receipt of the control signal; and a media content player configured to skip forward or rewind to play the media content starting at the identified starting point corresponding to a first one of the respective speech data segments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
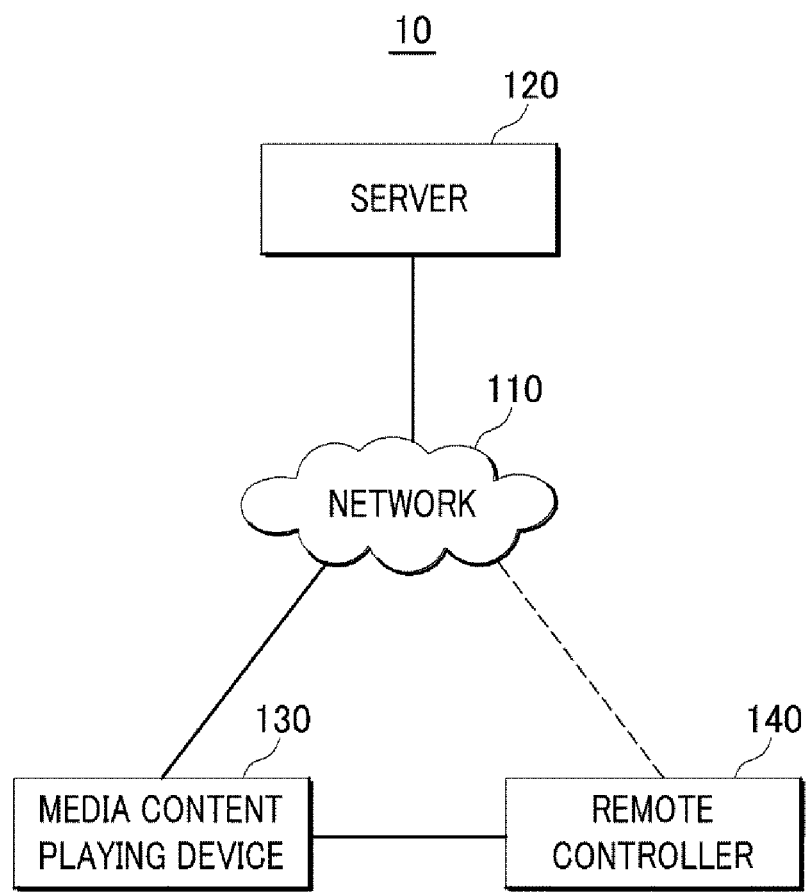
FIG. 1 shows an example system in which one or more embodiments of a media content playing scheme may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of a media content playing scheme may be implemented, in accordance with various embodiments described herein. As depicted in FIG. 1, system 10 may include, at least, a server 120, a media content playing device 130, and a remote controller 140. At least two or more of server 120, media content playing device 130 and remote controller 140 may be communicatively connected to each other via a network 110.

Network 110 may be a wired or wireless information or telecommunications network. Non-limiting examples of network 110 may include a wired network such as a LAN (Local Area Network), a WAN (Wide Area Network), a VAN (Value Added Network), a telecommunications cabling system, a fiber-optics telecommunications system, or the like. Other non-limiting examples of network 110 may include wireless networks such as a mobile radio communication network, including at least one of a $3^{rd}$, $4^{th}$, or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access); or the like.

Server 120 may be a processor-enabled computing device that is configured to detect speech data from media content. Non-limiting examples of the media content may include video files of various formats, which may be accessed via network 110, as regularly scheduled broadcast content, on-demand content, or pay-per-view content. Further, the media content may include movies, pre-recorded or live television shows, live sporting events, etc. Server 120 may utilize a voice activity detection (VAD) scheme or speech activity detection (SAD) scheme to detect speech data from the media content, before media content playing device 130 requests the speech data.

Server 120 may be further configured to divide the detected speech data into one or more speech data segments based on, at least, a respective speaker of at least a portion of the detected speech data and breaks in the detected speech data. As referenced herein, a break in the detected speech data may refer to silence for more than a threshold or predetermined amount of time, e.g., one second.

Further, one or more speech data segments that are divided from the detected speech data may be stored in a database that has a corresponding table that records the starting point and end point of each speech data segment. Further, in the table a plurality of speech data segments are recorded sequentially, based on, e.g., starting point. The table stores a starting point and an end point of each speech data segment in relation to the media content, in addition to each speech data segments.

Media content playing device 130 may be a device capable of playing media content in various video and audio formats. Non-limiting examples of media content playing device 130 may include, but not be limited to, an IPTV (Internet Protocol Television), a Smart TV (Smart TV), a Connected TV, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

Media content playing device 130 may be further configured to receive one or more of the stored speech data segments of media content from server 120. Further, media content playing device 130 may be configured to receive, in addition to one or more speech data segments, the table in which a plurality of speech data segments are sequentially recorded and a starting point and an end point of each speech data segment in relation to the media content may be stored.

Media content playing device 130 may be still further configured to receive, from an input device, a control signal to play the media content. The input device may include remote controller 140, a smart phone, a keyboard, a mouse, a barcode scanner, a digital camera, a joystick, and the like. In order to play the media content, media content playing device 120 may require video codec and/or audio codec.

For example, the video codec may include MPEG-1, MPEG-2, MPEG-4, DivX, Xvid, AVI and WMV, and the audio codec may include MP3, WMA, AAC and AC-3. The control signal that is received through a user interface may include an instruction to play, fast forward or rewind the media content. The user interface may be displayed on remote controller 140, and include control buttons. Another example of the control signal may include an instruction to fast forward or rewind. In addition, the control signal may include a signal to play the media content corresponding to the speech data segments consecutively or a signal to play media content corresponding to the speech data segments pertaining to a specific actor or actress identified in the respective speech data segments.

Media content playing device 130 may be configured to also identify one or more starting points for the respective speech data segments in the media content, upon receipt of the control signal. For example, while a speech data segment is being played and a control signal to skip forward is received once, media content playing device 130 may identify a starting point for the speech data segment that immediately follows the speech data segment that is being played. As another example, while a speech data segment is being played and a control signal to rewind is received once, media content playing device 130 may identify a starting point for the speech data segment that immediately precedes the speech data segment that is being played.

Media content playing device 130 may also be configured to skip forward or rewind to play the media content starting at the identified starting point corresponding to a first one of the respective speech data segments. That is, media content playing device 130 may be configured to skip forward from start-up or from a currently playing speech data segment to a starting point of a subsequent speech data segment, when the control signal to skip forward is input. Similarly, media content playing device 130 may be configured to rewind from start-up or from a currently playing speech data segment to a starting point of a preceding speech data segment.

Thus, FIG. 1 shows an example system 10 in which one or more embodiments of a media content playing scheme may be implemented, in accordance with various embodiments described herein.

Figure 2A:
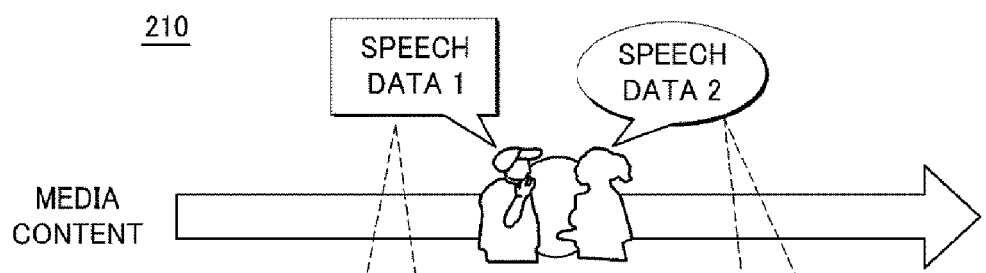
FIG. 2A shows a depiction of media content that is currently being played, in accordance with at least portions of a media content playing scheme as described herein.

FIG. 2A shows a depiction of media content that is currently being played, in accordance with at least portions of a media content playing scheme as described herein. FIG. 2A shows a depiction of media content that is currently being played or that is stored, e.g., a movie, a television show, etc., in which two people are shown and heard speaking with each other. In the media content as depicted in FIG. 2A, there are at least two human voices and at least one break between two or more human voices. As stated previously, a break may be considered to be silence for more than a predetermined or threshold amount of time, e.g., one second. The VAD scheme and the SAD scheme may recognize distinct human voices by measuring the existence of breaks between the human voices, and the recognized human voices may be processed as respective speech data segments.

Thus, FIG. 2A shows a depiction of media content that is currently being played on media content playing device 130, in accordance with at least portions of a media content playing scheme as described herein.

Figure 2B:
FIG. 2B shows a depiction of at least portions of speech data segments, in accordance with at least portions of a media content playing scheme, as described herein.

FIG. 2B shows a depiction of at least portions of speech data segments, in accordance with at least portions of a media content playing scheme, as described herein. As depicted in FIG. 2B, the time between a starting point and an end point of speech data segment 220 may be measured or determined in increments of seconds, minutes, hours, or combinations thereof. For example, the starting point and the end point of first speech data segment 221 may correspond to 00:00:15 and 00:03:17, respectively. In addition, the starting point and the end point of second speech data segment 222 may correspond to 00:03:25 and 00:04:17, respectively.

Thus, FIG. 2B shows a depiction of at least portions of speech data segments, in accordance with at least portions of a media content playing scheme, as described herein.

Figure 2C:
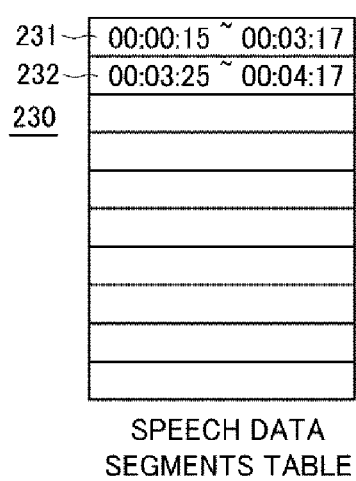
FIG. 2C shows an example speech data segments table in accordance with at least portions of a media content playing scheme, as described herein.

FIG. 2C shows an example speech data segments table in accordance with at least portions of a media content playing scheme, as described herein. FIG. 2C depicts speech data segments table 230 in which the starting point and the end point of each speech data segment may be stored sequentially in terms of starting point. For example, the first cell 231 in speech data segments table 230 may store the first speech data segment 221, and the second cell 232 in speech data segments table 230 may store the second speech data segment 222. In such a manner, the remaining speech data segments may be stored sequentially in speech data segments table 230, because the starting point and the end point of each speech data segment may be stored sequentially in terms of starting point.

In some other embodiments, server 120 may also tag or label the respective speech data segments and the tags or labels corresponding to the respective speech data segments may be also stored in the speech data segments table along with the speech data segments. Media content playing device 130 may receive a control signal that corresponds to the tag number input through user interface 233.

User interface 233 may include graphical user interfaces (GUI) which accept input via devices such as a computer keyboard and mouse and provide articulated graphical output on the computer monitor, web-based user interfaces or web user interfaces (WUI) that accept input and provide output by generating web pages which are transmitted via the Internet and viewed by the user using a web browser program, or touch screens, that is, some displays that accept input by touch of fingers or a stylus, etc.

Once the control signal is received, media content playing device 130 may identify a starting point for the corresponding speech data segment to the tag or label (e.g. #7 representing the 7$^{th}$ speech data segment in a sequence of speech data segments) in the media content, and skip forward or rewind to play the media content starting at the identified starting point.

In some other embodiments, server 120 may distinguish the speech data segments generated based on a specific actor or actress from the rest of the speech data segments, by tagging such specific actor or actress's speech data segments by his or her name. For example, from an input device, media content playing device 130 may receive a control signal (e.g. a user may type the specific actor's name in remote controller or push a button of the specific actor's name) to play the specific actor's speech data segment in the media content.

Then, media content playing device 130 may identify one or more starting points for the specific actor's speech data segment, upon receipt of the control signal. Further, media content playing device 130 may skip forward or rewind to consecutively play the media content starting at the identified starting points corresponding to the specific actor's speech data segment.

Thus, FIG. 2C shows an example speech data segments table in accordance with at least portions of a media content playing scheme, as described herein.

Figure 3:
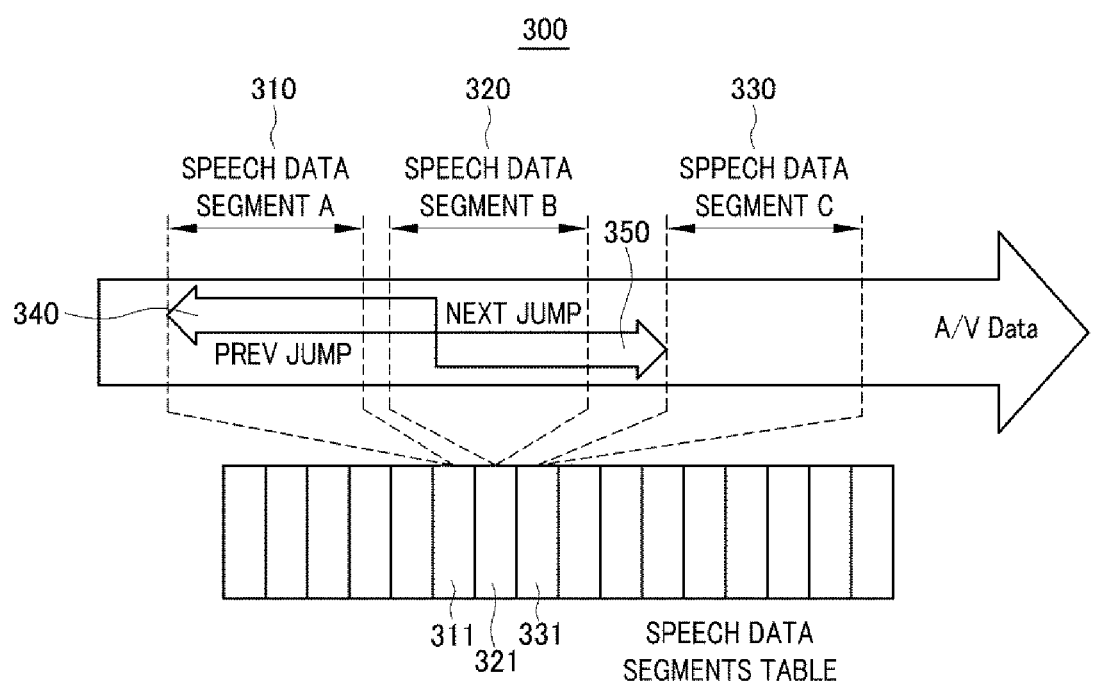
FIG. 3 shows an example of speech data segments and a corresponding table by which at least portions of a media content playing scheme may be implemented, in accordance with various embodiments described herein.

FIG. 3 shows an example of speech data segments and their table by which at least portions of a media content playing scheme may be implemented, in accordance with various embodiments described herein. According to FIG. 3, media content playing device 130 may skip the media content by a unit of speech data segment. For example, if media content playing device 130 is playing speech data segment B 320 at present, duration data 321 of the speech data segment B 320 may include a starting point and an end point of the speech data segment B 320. Further, if a control signal of REW (rewind) or "←" is received through a user interface once, then media content playing device 130 may skip a playing point to a starting point of a duration data 311 of a speech data segment A 310, after analyzing a duration data 311 of the speech data segment A 310 as previous speech data segment.

In some other example, if a control signal of FF (forward) or "→" is received through a user interface once, then media content playing device 130 may skip a playing point to a starting point of a duration data 331 of a speech data segment C 330, after analyzing a duration data 331 of the speech data segment C 330 as previous speech data segment.

In some embodiments, if media content playing device 130 is playing speech data segment A 310 at present, a duration data 311 of the speech data segment A 310 may include a starting point and an end point of the speech data segment A 310. Then, if a control signal of FF (forward) or "→" is received through a user interface twice, then media content playing device 130 may skip a playing point to a starting point of a duration data 331 of a speech data segment C 330, after analyzing a duration data 331 of the speech data segment C 330 as speech data segment after speech data segment B.

Thus, FIG. 3 shows an example of speech data segments and their table by which one or more embodiments of a media content playing scheme may be implemented, in accordance with various embodiments described herein.

Figure 4:
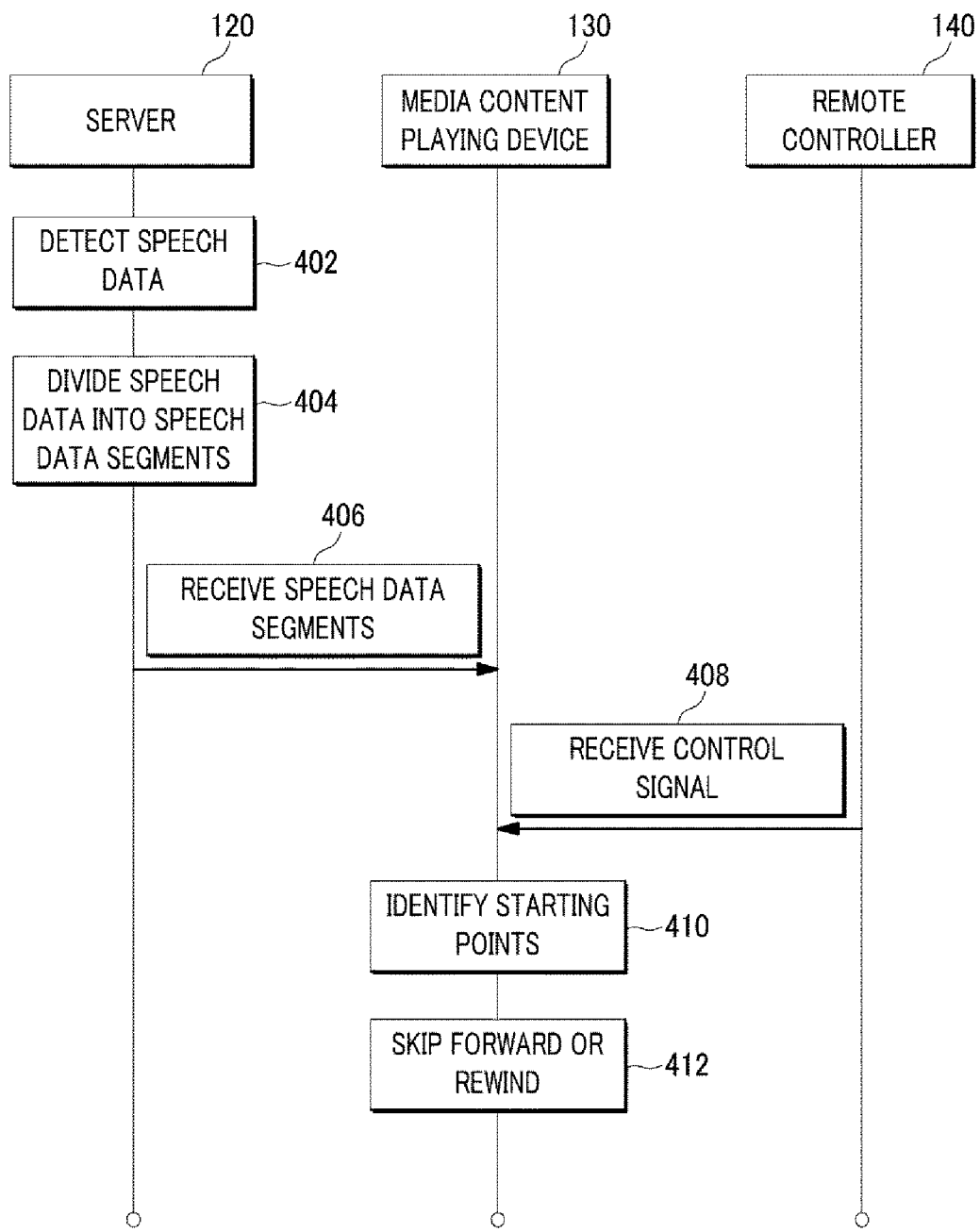
FIG. 4 shows an example processing flow of operations by which at least portions of a media content playing scheme may be implemented, in accordance with various embodiments described herein.

FIG. 4 shows an example processing flow 400 of operations by which at least portions of a media content playing scheme may be implemented, in accordance with various embodiments described herein. The operations of processing flow 400 may be implemented in system configuration 10 including, at least, server 120, media content playing device 130 and remote controller 140, as illustrated in FIG. 1. Processing flow 400 may include one or more operations, actions, or functions as illustrated by one or more blocks 402, 404, 406, 408, 410, and/or 412. Although illustrated as discrete blocks, various blocks may be divided into additional blocks, combined into fewer blocks, or eliminated, depending on the desired implementation. Processing may begin at block 402.

Block 402 (Detect Speech Data) may refer to server 120 detecting speech data from media content. The VAD scheme and the SAD scheme, as non-limiting examples of voice detecting schemes, may be used for detecting the speech data. The VAD scheme and the SAD scheme may recognize distinct human voices by measuring the existence of breaks between the human voices and by instantaneously measuring a divergence distance between speech and noise from the media content. The recognized human voices may be transformed to the respective speech data segments. VAD, also known as speech activity detection or speech detection, may be a technique used in speech processing in which the presence or absence of human speech is detected. VAD may be utilized, e.g., in speech coding and speech recognition, and facilitate speech processing. Processing may proceed from block 402 to block 404

Block 404 (Divide Speech Data Into Speech Data Segments) may refer to server 120 dividing the detected speech data into one or more speech data segments, in accordance with at least a respective speaker and a break in the detected speech data. At block 404, server 120 may divide the detected speech data into one or more speech data segments having various durations. Further, one or more speech data segments that are divided from the detected speech data may be recorded in table 230 in which a plurality of speech data segments may be sequentially recorded. Table 230 may store a starting point and an end point of each speech data segment in relation to the media content.

In some embodiments, the respective speech data segments may have their durations for which a starting point and an end point of each speech data segment may be determined in time increments of hours, minutes, and/or seconds. For example, the starting point and the end point of the first speech data segment may correspond to 00:00:15 and 00:03:17, respectively. In addition, the starting point and the end point of the subsequent speech data segment may correspond to 00:03:25 and 00:04:17, respectively. The time difference between starting point 00:03:17 and end point 00:03:25 may correspond to a break for which no human voice is detected. In this manner, server 120 may continue to divide the detected speech data into a plurality of speech data segment having respective durations.

After completing the division of the detected speech data, speech data segments table 230 may store the starting point and the end point of each speech data segment sequentially. As non-limiting example of a break, if there is no human voice detected for more than 1 second, then the measured silence may be recognized as a break. The way in which a break may be determined may be subject to change, depending on various voice detection schemes.

In some embodiments, server 120 may also tag the respective speech data segment, and the tags may be also stored in speech data segments table 230 along with the speech data segment. For example, the first speech data segment having duration of 00:00:15 to 00:03:17 may be tagged as "#1". In the same manner, the subsequent speech data segment having duration of 00:03:25 and 00:04:17 may be tagged as "#2". Server 120 may complete tagging all of the generated speech data segments.

In some embodiments, server 120 may tag the respective speech data segment using the names, e.g., actors and/or actresses, of the speakers. The names used as tags may also be stored in speech data segment table 230 along with the speech data segment. For example, if the first and third speech data segment are related to only a specific actor, then server 120 may tag the first and third speech data segment using that actor's name.

In some other embodiments, server 120 may distinguish the speech data segment generated based on actors' voices in the media content from the speech data segment generated based on actress's voices, by tagging the actor's speech data segment as "male" and the actress' speech data segment as "female". For example, the first, second, and fourth speech data segments may be tagged as "male", while the third and fifth speech data segments may be tagged as "female". Processing may proceed from block 404 to block 406.

Block 406 (Receive Speech Data Segments) may refer to media content playing device 130 receiving the speech data segments from server 102. First, media content playing device 130 may request, from server 102, the speech data segment. After server 102 transmits the speech data segment generated based on the detected speech data, media content playing device 130 may receive the speech data segments that may be recorded in table 230 in which a plurality of speech data segments may be sequentially recorded. Table 230 may also store a starting point and an end point of each speech data segments in relation to the media content. In addition to the speech data segments, media content playing device 130 may receive tags, e.g., numbers and/or names. Processing may proceed from block 406 to block 408.

Block 408 (Receive Control Signal) may refer to media content playing device 103 receiving, from an input device, a control signal to play the media content. For example, the control signal may include a signal to skip forward and a signal to rewind, or "FF" and "REW". Further, the control signal may include a typed name of actor/actress, a typed gender (e.g. male or female), and a signal to consecutively play the media content corresponding to the speech data segments. An input device may include remote controller 140, a smart phone, a keyboard, a mouse, a barcode scanner, a digital camera, a joystick, and the like.

In some embodiments, when a control signal of REW (rewind) may be received via a user interface once, then media content playing device 130 may start to play previous speech data segment (e.g. speech data segment A 310 in FIG. 3), while media content playing device 130 stops playing present speech data segment (e.g. speech data segment B 320 in FIG. 3).

On the other hand, once a control signal of FF (Fast Forward) is received via a user interface, then media content playing device 130 may start to play subsequent speech data segment (e.g. speech data segment C 330 in FIG. 3), while media content playing device 130 stops playing present speech data segment (e.g. speech data segment B 320 in FIG. 3).

In some embodiments, when a REW (rewind) control signal is received via a user interface requesting that the rewind function be activated twice, then media content playing device 130 may start to play previous speech data segment twice removed (e.g. speech data segment A 310 in FIG. 3), while media content playing device 130 stops playing the presently played speech data segment (e.g. speech data segment C 330 in FIG. 3).

On the other hand, when a control signal of FF (Fast Forward) may be received via a user interface requesting that the fast-forward function be activated twice, then media content playing device 130 may start to play subsequent speech data segment twice-removed (e.g. speech data segment C 330 in FIG. 3), while media content playing device 130 stops playing the presently played speech data segment (e.g. speech data segment A 310 in FIG. 3).

In some embodiments, when a control signal identifying an actor/actress's name is received via a user interface, then media content playing device 130 may start to play speech data segments pertaining to the actor/actress, which may be recognized by voice detection scheme.

In some other embodiments, when a control signal tag (e.g. #14) is received through a user interface, then media content playing device 130 may start to play speech data segments corresponding to the tag, while media content playing device 130 stops playing the presently played speech data segment (e.g. #4).

In some embodiments, when a control signal to consecutively play the media content corresponding to the speech data segment is received through a user interface, then media content playing device 130 may start to consecutively play the corresponding speech data segments, while media content playing device 130 stops playing present speech data segment. Processing may proceed from block 408 to block 410.

Block 410 (Identify Starting Points) may refer to media content playing device 130 identifying one or more starting points for the respective speech data segments in the media content, upon receipt of the control signal. For example, the starting point and the end point of the first speech data segment may correspond to 00:00:15 and 00:03:17, respectively.

In addition, the starting point and the end point of the second speech data segment in sequence may correspond to 00:03:25 and 00:04:17, respectively. While media content playing device 130 is playing the second speech data, if a control signal of "REW" is received through a user interface, then media content playing device 130 may identify the starting point of the first speech data segment, or 00:00:15, so that media content playing device 130 may start to play the starting point of the first speech data segment.

In some other embodiments, once a control signal identifying a tag number is received through a user interface, then media content playing device 130 may identify a starting point of speech data segment corresponding to the tag number. Processing may proceed from block 410 to block 412.

Block 412 (Skip Forward or Rewind) may refer to media content playing device 130 skipping forward or rewinding to play the media content starting at the identified starting point corresponding to a first one of the respective speech data segments. For example, while media content playing device 130 is playing a second speech data segment, if according to a control signal media content playing device identifies a starting point of a fifth speech data segment, then media content playing device 130 may skip a third and fourth speech data segment to reach and play the identified starting point of the fifth speech data segment.

In some embodiments, while media content playing device 130 is playing the second speech data segment, if, according to a control signal, media content playing device may identify a starting point of the first speech data segment, then media content playing device 130 may rewind to play the identified starting point of the first speech data segment.

Thus, FIG. 4 shows an example processing flow 400 of operations by which at least portions of a media content playing scheme may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
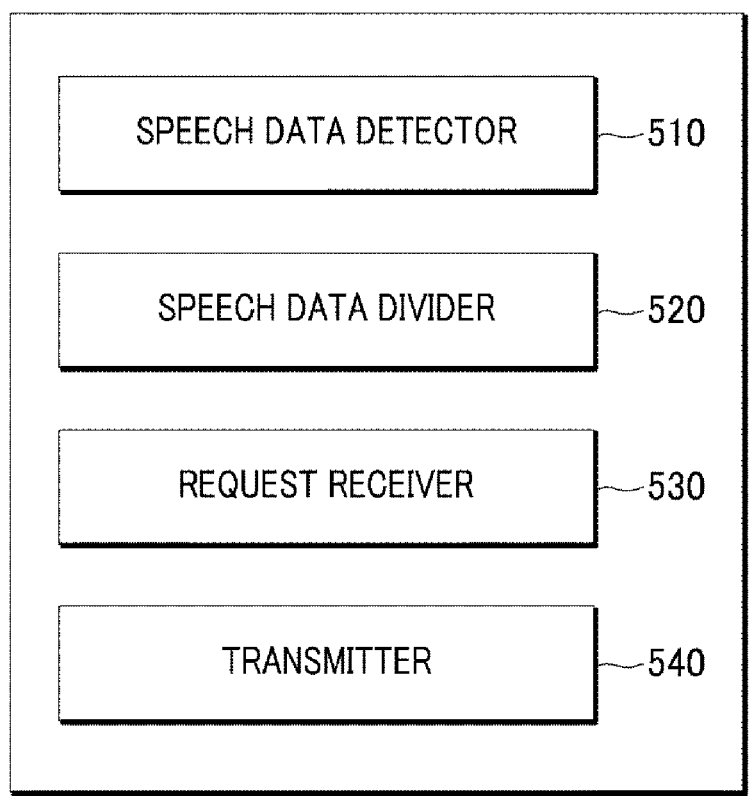
FIG. 5 shows an example server by which at least portions of a media content providing scheme may be implemented, in accordance with various embodiments described herein.

FIG. 5 shows an example server by which at least portions of a media content playing scheme may be implemented, in accordance with various embodiments described herein. As depicted in FIG. 5, for example, server 120 may include a speech data detector 510, a speech data divider 520, a request receiver 530, and a transmitter 540. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of speech data detector 510, speech data divider 520, request receiver 530, and transmitter 540 may be included in an instance of an application hosted on server 120.

Speech data detector 510 may be configured to detect speech data from media content. Non-limiting examples of the media content may include movies, pre-recorded or live television shows, live sporting events, etc. Speech data detector 510 may utilize voice activity detection scheme (VAD) or speech activity detection scheme (SAD) to detect speech data from the media content, before media content playing device 130 requests the speech data. The VAD scheme may instantaneously measure a divergence distance between speech and noise from the media content.

VAD, also known as speech activity detection or speech detection, may be a technique used in speech processing in which the presence or absence of human speech is detected. The main uses of VAD may be in speech coding and speech recognition, and facilitate speech processing.

Speech data divider 520 may be configured to divide the detected speech data into one or more speech data segments in accordance with at least a respective speaker and a break in the detected speech data. In some embodiments, the speech data segments may have a starting point and an end point of each speech data segment in relation to the media content. Thus, the respective speech data segments may have their duration for which a starting point and an end point of each speech data segment are determined in increments of seconds, minutes, hours, or combinations thereof.

For example, the starting point and the end point of the first speech data segment may correspond to 00:00:15 and 00:03:17, respectively. In addition, the starting point and the end point of subsequent speech data segment may correspond to 00:03:25 and 00:04:17, respectively. The time difference between 00:03:17 and 00:03:25 may correspond to a break for which no human voice is detected.

Further, speech data divider 520 may be configured to store a table in which a plurality of speech data segments are sequentially recorded and a starting point and an end point of each speech data segment in relation to the media content.

Request receiver 530 may be configured to receive a request to transmit the speech data segments to media content playing device 130. The request from media content playing device 130 may be transmitted to request receiver 530 via network 110. Non-limiting examples of network 110 may include Wi-Fi, Internet, LAN (Local Area Network), Wireless LAN (Wireless Local Area Network), WAN (Wide Area Network), PAN (Personal Area Network), 3G, 4G, LTE, and the like.

Transmitter 540 may be configured to transmit the speech data segments to media content playing device 130 via network 110. Media content playing device 130 may include, for example, but not as a limitation, an IPTV (Internet Protocol Television), a Smart TV (Smart TV), a Connected TV, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal. For another example, media content playing device 130 may include portable wireless communication device, such as net book, ultra book, sub-notebook, Desk Note, ultra-mobile pc, and the like.

Thus, FIG. 5 shows an example server by which at least portions of a media content playing scheme may be implemented, in accordance with various embodiments described herein.

Figure 6:
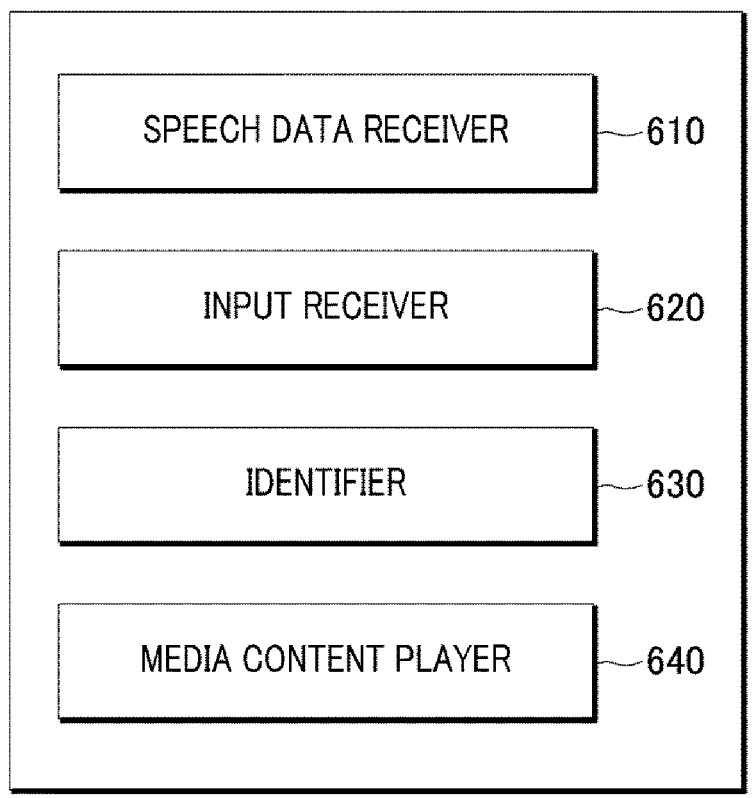
FIG. 6 shows an example media content playing device by which at least portions of a media content playing scheme may be implemented, in accordance with various embodiments described herein.

FIG. 6 shows an example media content playing device by which at least portions of a media content playing scheme may be implemented, in accordance with various embodiments described herein. As depicted in FIG. 6, for example, media content playing device 130 may include a speech data receiver 610, an input receiver 620, an identifier 630, and a media content player 640. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of speech data receiver 610, input receiver 620, identifier 630, and media content player 640 may be included in an instance of an application hosted on media content playing device 130.

Speech data receiver 610 may be configured to receive speech data segments from server 120. The speech data segments may have a starting point and an end point of each speech data segment in relation to the media content. Thus, the respective speech data segments may have their duration for which a starting point and an end point of each speech data segment are determined in increments of seconds, minutes, hours, or combinations thereof.

Further, speech data receiver 610 may be configured to receive a table in which a plurality of speech data segments is sequentially recorded and the starting and end points of speech data segments. For example, the starting point and the end point of the first speech data segment may correspond to 00:00:15 and 00:03:17, respectively. In addition, the starting point and the end point of subsequent speech data segment may correspond to 00:03:25 and 00:04:17, respectively.

Input receiver 620 may be configured to receive, from an input device, a control signal to play media content. The input device may include remote controller. The control signal that is received through a user interface may include an instruction to play, fast forward or rewind. Another example of the control signal may include an arrow or a unit vector to represent fast forward or rewind, e.g. → or ←.

For another example, the control signal may include an actor/actress's name, gender, tag number, and a signal to consecutively play the media content. Further, based on the control signal, media content playing device 130 may determine which speech data segment should be played immediately upon receipt of the control signal.

Identifier 630 may be configured to identify one or more starting points for the respective speech data segments in the media content, upon receipt of the control signal. For example, once a control signal of REW (rewind) is received through a user interface once, then identifier 630 may identify a starting point of previous speech data segment (e.g. speech data segment A 310 in FIG. 3), while presently played speech data segment (e.g. speech data segment B 320 in FIG. 3) is being played.

On the other hand, once a control signal of FF (Fast Forward) is received through a user interface once, then identifier 630 may identify a starting point of subsequent speech data segment (e.g. speech data segment C 330 in FIG. 3), while presently played speech data segment (e.g. speech data segment B 320 in FIG. 3) is being played.

For another example, once a control signal of REW (rewind) is received through a user interface twice, then identifier 630 may identify a starting point of previous speech data segment twice removed (e.g. speech data segment A 310 in FIG. 3), while presently played speech data segment (e.g. speech data segment C 330 in FIG. 3) is being played.

On the other hand, once a control signal of FF (Fast Forward) is received through a user interface twice, then identifier 630 may identify a starting point of subsequent speech data segment twice removed (e.g. speech data segment C 330 in FIG. 3), while presently played speech data segment (e.g. speech data segment A 310 in FIG. 3) is being played.

In some embodiments, once a control signal of actor/actress's name is received through a user interface, then identifier 630 may identify a starting point of speech data segment related to the actor/actress.

In some other embodiments, once a control signal of tag number (e.g. #14) is received through a user interface, then identifier 630 may identify a starting point of speech data segment corresponding to the tag number, while media content playing device 130 stops playing present speech data segment (e.g. #4).

Media content player 640 may be configured to skip forward or rewind to play the media content starting at the identified starting point corresponding to a first one of the respective speech data segments.

In some embodiments, media content player 640 may be configured to skip to play the media content corresponding to a starting point of a different speech data segment when the control signal to skip forward is input while the media content corresponding to the first one of the respective speech data segments is being played.

In some other embodiments, media content player 640 may be configured to skip to play the media content corresponding to a starting point of a different speech data segment when the control signal to skip reverse is input while the media content corresponding to the first one of the respective speech data segments is being played.

For example, while media content player 640 is playing second speech data segment, if according to a control signal media content player 640 identifies a starting point of the fifth speech data segment, then media content player 640 may skip the third and fourth speech data segment to reach and play the identified starting point of the fifth speech data segment.

Thus, FIG. 6 shows an example media content playing device by which at least portions of a media content playing scheme may be implemented, in accordance with various embodiments described herein.

Figure 7:
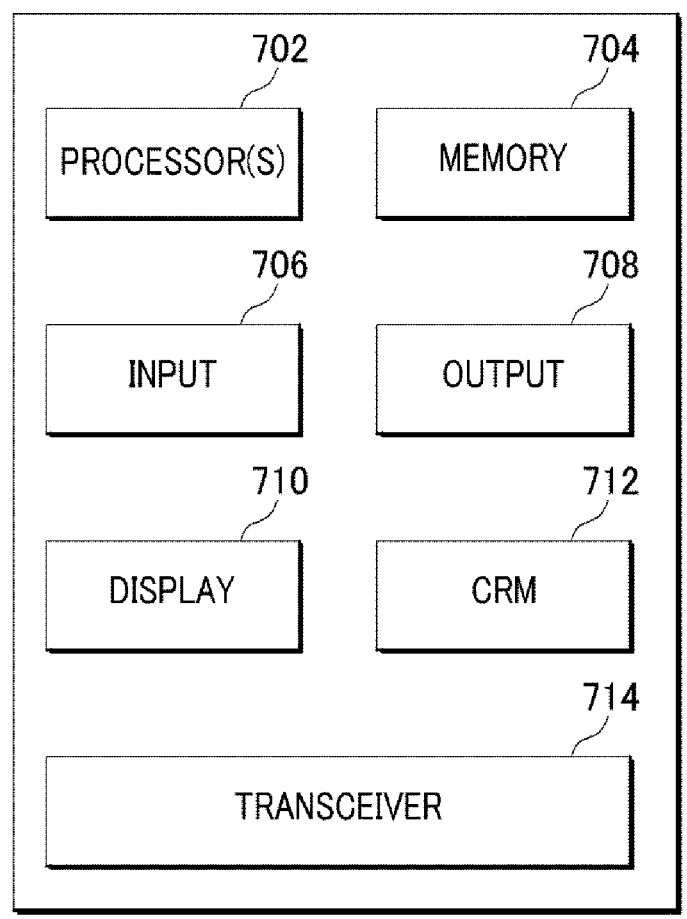
FIG. 7 shows an illustrative computing embodiment, in which any of the processes and sub-processes of a media content playing scheme may be implemented as computer-readable instructions stored on a computer-readable medium, in accordance with various embodiments described herein.

FIG. 7 shows an illustrative computing embodiment, in which any of the processes and sub-processes of a media content playing scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 700 may typically include, at least, one or more processors 702, a system memory 704, one or more input components 706, one or more output components 708, a display component 710, a computer-readable medium 712, and a transceiver 714.

Processor 702 may refer to, e.g., a microprocessor, a microcontroller, a digital signal processor, or any combination thereof.

Memory 704 may refer to, e.g., a volatile memory, non-volatile memory, or any combination thereof. Memory 704 may store, therein, an operating system, an application, and/or program data. That is, memory 704 may store executable instructions to implement any of the functions or operations described above and, therefore, memory 704 may be regarded as a computer-readable medium.

Input component 706 may refer to a built-in or communicatively coupled keyboard, touch screen, or telecommunication device. Alternatively, input component 706 may include a microphone that is configured, in cooperation with a voice-recognition program that may be stored in memory 704, to receive voice commands from a user of computing device 700. Further, input component 706, if not built-in to computing device 700, may be communicatively coupled thereto via short-range communication protocols including, but not limitation, radio frequency or Bluetooth.

Output component 708 may refer to a component or module, built-in or removable from computing device 700, that is configured to output commands and data to an external device.

Display component 710 may refer to, e.g., a solid state display that may have touch input capabilities. That is, display component 710 may include capabilities that may be shared with or replace those of input component 706.

Computer-readable medium 712 may refer to a separable machine readable medium that is configured to store one or more programs that embody any of the functions or operations described above. That is, computer-readable medium 712, which may be received into or otherwise connected to a drive component of computing device 700, may store executable instructions to implement any of the functions or operations described above. These instructions may be complimentary or otherwise independent of those stored by memory 704.

Transceiver 714 may refer to a network communication link for computing device 700, configured as a wired network or direct-wired connection. Alternatively, transceiver 714 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 7 shows an illustrative computing embodiment, in which any of the processes and sub-processes of a media content playing scheme may be implemented as computer-readable instructions stored on a computer-readable medium, in accordance with various embodiments described herein.

I claim:

1. A system, comprising:
   a server configured to:
      detect speech data from media content,
      divide the detected speech data into one or more speech data segments in accordance with at least a respective speaker and a break in the detected speech data, and
      tag the respective speech data segments using respective tag numbers; and
   a media content playing device configured to:
      receive the speech data segments and the respective tag numbers from the server,
      receive, from an input device, a control signal to play the media content, wherein the input device comprises a user interface that enables to receive the control signal identifying respective tag number inputs corresponding to the respective speech data segments,
      identify one or more starting points for the respective speech data segments in the media content, upon receipt of the control signal,
      skip forward or rewind to play the media content starting at the identified starting point corresponding to a first one of the respective speech data segments, and
      skip to play the media content corresponding to a starting point of a different speech data segment that follows the first one of the respective speech data segments when the control signal including a signal to skip forward is received from the input device while the media content corresponding to the first one of the respective speech data segments is being played, wherein the control signal further includes a tag number input that is received via the user interface and that corresponds to the different speech data segment, so as to enable the media content to be skipped forward to the starting point of the different speech data segment based on the tag number input.

2. The system of claim 1, wherein the server is configured to detect the speech data by using at least one of a VAD (Voice Activity Detection) scheme or an SAD (Speech Activity Detection) scheme.

3. The system of claim 2, wherein the VAD scheme is configured to detect the speech data by instantaneously measuring a divergence distance between speech and noise from the media content.

4. The system of claim 1, wherein the speech data segments are recorded in a table in which a plurality of speech data segments are sequentially recorded.

5. The system of claim 4, wherein the table stores a starting point and an end point of each speech data segment in relation to the media content.

6. The system of claim 1, wherein the control signal includes at least one of a signal to skip forward and a signal to rewind.

7. A system, comprising:
   a server configured to:
      detect speech data from media content,
      divide the detected speech data into one or more speech data segments in accordance with at least a respective speaker and a break in the detected speech data, and tag the respective speech data segments using respective tag numbers; and a media content playing device configured to:
  receive the speech data segments and the respective tag numbers from the server,
  receive, from an input device, a control signal to play the media content, wherein the input device comprises a user interface that enables to receive the control signal identifying respective tag number inputs corresponding to the respective speech data segments,
  identify one or more starting points for the respective speech data segments in the media content, upon receipt of the control signal,
  skip forward or rewind to play the media content starting at the identified starting point corresponding to a first one of the respective speech data segments, and
  skip to play the media content corresponding to a starting point of a different speech data segment that precedes the first one of the respective speech data segments when the control signal including a signal to skip reverse is received from the input device while the media content corresponding to the first one of the respective speech data segments is being played, wherein the control signal further includes a tag number input that is received via the user interface and that corresponds to the different speech data segment, so as to enable the media content to be skipped reverse to the starting point of the different speech data segment based on the tag number input.

8. A system, comprising:
a server configured to:
  detect speech data from media content,
  divide the detected speech data into one or more speech data segments in accordance with at least a respective speaker and a break in the detected speech data, and
  tag the respective speech data segments using respective tag numbers and respective tag names for actors or actresses; and a media content playing device configured to:
  receive the speech data segments, and the respective tag numbers and tag names from the server,
  receive, from an input device, a control signal to play the media content, wherein the input device comprises a user interface that enables to receive the control signal identifying respective tag number inputs and respective tag name inputs corresponding to the respective speech data segments,
  identify one or more starting points for the respective speech data segments in the media content, upon receipt of the control signal, and
  skip forward or rewind to play the media content starting at the identified starting point corresponding to a first one of the respective speech data segments,
  wherein the control signal includes a signal to consecutively play the media content corresponding to the speech data segments, and
  wherein the control signal includes a signal to play the media content corresponding to the speech data segments in relation to a specific actor or actress identified in the respective speech data segments, wherein the control signal further includes a tag number input that is received via the user interface and that corresponds to a different speech data segment, and further includes a tag name input that is received via the user interface and that corresponds to the different speech data segment, so as to enable the media content to be skipped and consecutively played at the different speech data segment corresponding to the specific actor or actress based on the tag number input and the tag name input.

9. A media content playing device comprising:
a speech data receiver configured to receive speech data segments and respective tag numbers for respective speech data segments from a server;
an input receiver configured to receive, from an input device, a control signal to play a media content, wherein the input device comprises a user interface that enables to receive the control signal identifying respective tag number inputs corresponding to the respective speech data segments;
an identifier configured to identify one or more starting points for the respective speech data segments in the media content, upon receipt of the control signal; and
a media content player configured to skip forward or rewind to play the media content starting at the identified starting point corresponding to a first one of the respective speech data segments,
wherein the media content playing device is further configured to:
  skip to play the media content corresponding to a starting point of a different speech data segment that follows the first one of the respective speech data segments when the control signal including a signal to skip forward is received from the input device while the media content corresponding to the first one of the respective speech data segments is being played, and
  skip to play the media content corresponding to a starting point of a different speech data segment that precedes the first one of the respective speech data segments when the control signal including a signal to skip reverse is received from the input device while the media content corresponding to the first one of the respective speech data segments is being played, wherein the control signal further includes a tag number input that is received via the user interface and that corresponds to the different speech data segment, so as to enable the media content to be skipped forward or reverse to the starting point of the different speech data segment based on the tag number input.

10. The media content playing device of claim 9, wherein the control signal includes at least one of a signal to skip forward and a signal to skip reverse.

11. The media content playing device of claim 9, wherein the control signal includes a signal to consecutively play the media content corresponding to the speech data segments.

12. A media content playing device comprising:
a speech data receiver configured to receive speech data segments and respective tag numbers for respective speech data segments from a server;
an input receiver configured to receive, from an input device, a control signal to play a media content, wherein the input device comprises a user interface that enables to receive the control signal identifying respective tag number inputs and respective tag name inputs corresponding to the respective speech data segments;
an identifier configured to identify one or more starting points for the respective speech data segments in the media content, upon receipt of the control signal; and a media content player configured to skip forward or rewind to play the media content starting at the identified starting point corresponding to a first one of the respective speech data segments, wherein the control signal includes a signal to play the media content corresponding to the speech data segments in relation to a specific actor or actress identified in the respective speech data segments, wherein the control signal further includes a tag number input that is received via the user interface and that corresponds to a different speech data segment, and further includes a tag name input that is received via the user interface and that corresponds to the different speech data segment, so as to enable the media content to be skipped and consecutively played at the different speech data segment corresponding to the specific actor or actress based on the tag number input and the tag name input.

\* \* \* \* \*